Patented Apr. 22, 1952

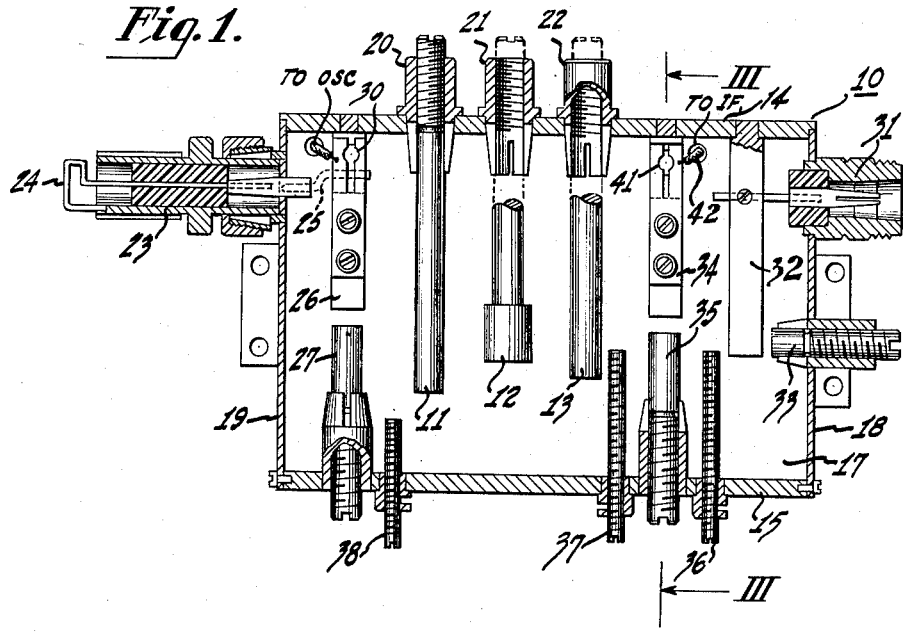

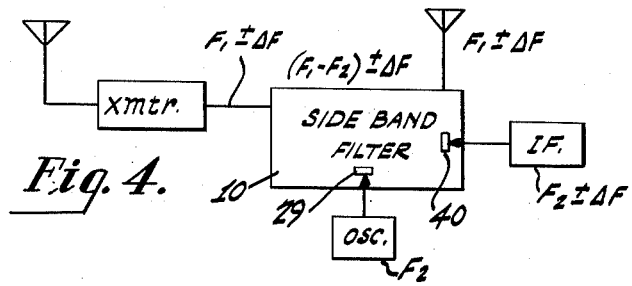
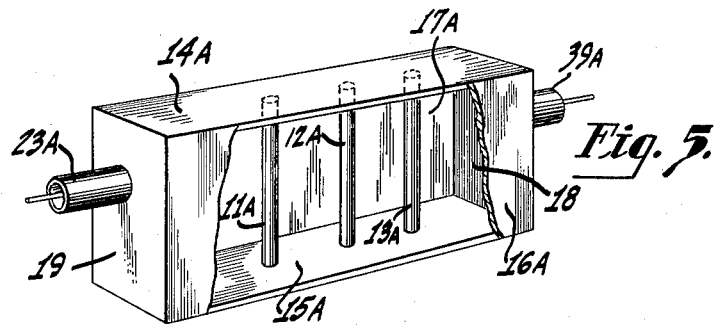
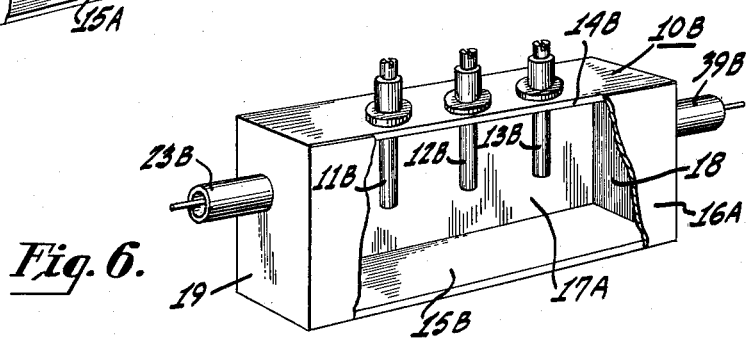
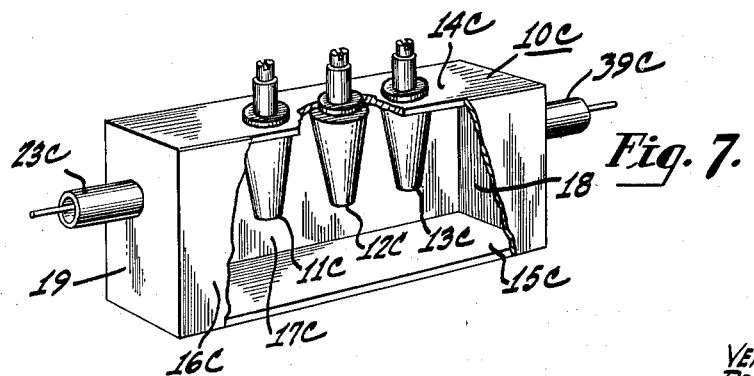

2,594,037

UNITED STATES PATENT OFFICE 2,594,037

ULTRAHIGH-FREQUENCY FILTER

Vernon D. Landon, Robert L. Harvey and Eugene O. Keizer, Princeton, N. J., assignors to Radio Corporation of America, a corporation of Delaware Application August 28, 1946, Serial No. 693,506

9 Claims. (Cl. 178—44)

This invention relates to high-frequency filter systems and particularly to side-band filters for high-frequency receivers of the superheterodyne type as utilized in frequency-modulated object locator systems or equivalent.

Generally in accordance with the invention, the filter comprises an elongated cavity or waveguide operated at frequencies below its cut-off frequency and within which there are disposed a plurality of structures, such as metal rods or the like, which are spaced longitudinally of the guide and which coact therewith and with each other to provide a corresponding number of coupled tuned circuits which pass through the guide certain desired frequencies to the substantial exclusion of other frequencies. More specifically, the dimensions, spacing and orientation of the rods or equivalent, and the dimensions of the guide are selected to pass a desired band of frequencies, such as difference-frequencies resulting from mixing frequency-modulated high-frequency energy and high-frequency energy of different constant frequency, and to reject other frequencies such as said contant frequency and those of said frequency-modulated high-frequency energy.

In some forms of the invention, the rods are of uniform cross section, one half wavelength long at a frequency to be rejected by the filter, and are connected at their opposite ends to opposite side walls of the guide, whereas in other forms of the invention the rods are each one quarter wavelength long at a frequency to be rejected and may be of uniform cross-sectional area or of cross-sectional area which decreases in direction from the side wall of the guide to which the rod is connected.

The invention further resides in features of construction, combination and arrangement hereinafter described and claimed.

For a more detailed understanding of the invention and for illustration of exemplary embodiments thereof, reference is made to the accompanying drawings, in which:

Figure 1 is a front elevational view, with parts broken away and partly in section, of an ultrahigh-frequency filter and mixing device;

Figure 2 is a top plan view of Figure 1;

Figure 3 is a side sectional view taken on the line 3—3 of Figure 1;

Figure 4 is a block diagram of a system including the filter-mixer device of Figure 1; and Figures 5, 6 and 7 are perspective views, with parts broken away, of modifications of the filter arrangement shown in Figure 1.

Referring to Figures 1-3, illustrative of one form of the invention as embodied in the frequency-modulated radar system of Figure 4, the elongated cavity structure or wave-guide 10 is of such dimensions that its cut-off frequency is higher than the frequencies to be attenuated and the frequencies to be transmitted along it. Within the guide a plurality of cascaded resonant circuits are provided by the plungers or rods 11, 12, and 13 spaced from one another longitudinally of the guide. The spacing between side walls of the guide and the spacing between the rods determines the percentage coupling between these resonant circuits and, therefore, the width of the frequency band passed by the circuits. The number of tuned circuits, three in the particular embodiment shown, is chosen to give the desired selectivity.

It is difficult initially to predict the proper spacing between the rods for the attainment of the desired coupling but after the coupling has been determined for a given spacing, the proper spacing for the desired band width may be readily and accurately calculated for the reason that the propagation in a wave-guide operated at frequencies substantially below the cut-off frequency, for example, 50 per cent or more, is attenuated 27.3 decibels in a distance equal to the spacing between sides of the cavity. Hence for example, to change the coupling between the tuned circuits by five per cent the spacing between the rods is changed by an amount corresponding to five per cent of the side wall spacing, i. e., the distance between the side walls 14 and 15 or 16 and 17. By way of example, in the particular arrangement shown in Figures 1-3, the spacing between the plungers is .625 inch, affording a band width of 25 megacycles at a mean frequency of 1380 megacycles. The spacing between the narrow side walls 14 and 15 is 2.65 inches and the spacing between the wide side walls 16 and 17 is 0.678 inch.

From the general rule given and the specific example above, the proper spacing can be determined for other band widths and for the same or other band widths at different mean frequencies. The above rule is not too accurate for very close spacing of the rods, i. e., large percentages of coupling, and hence cannot in such cases be used directly to predetermine the magnitude of the coupling but can be relied upon for obtaining ratios from some known coupling. Hence with this additional information, there is no difficulty in designing a band-pass filter having desired band width and cut-off frequency.

The coupling between the rods 11, 12 and 13 is partly inductive and partly capacitive and in the particular arrangement shown in Figure 1, these two couplings are in opposition or buck each other. Consequently, at a certain frequency these couplings are equal and opposite with the result that for such frequency there is no transfer of energy between the circuits, and such frequencies therefore correspond with one cut-off frequency of the filter network formed by the rods and the cavity.

With rods such as rods 11a, 12a, and 13a, Figure 5, which are parallel, of uniform cross section, one half wavelength long and connected at both ends to one pair of opposite side walls of the guide, the inductive and capacitive couplings reduce to zero at the resonant frequency of the rods, ignoring fringing effects. With rods such as rods 11b—13b of Figure 6 and rods 11c—13c of Figure 7, which are one quarter wavelength long, the inductive coupling outweighs the capacitive coupling at lower frequencies; this condition is enhanced by tapering of the rods, as in Figure 7, with the larger diameter or cross section of each rod at its grounded end. For such enhancement, an abrupt change in diameter or cross section is just as effective as a gradual change of taper. If greater capacity coupling is required to meet the filtering needs of a particular system, the free or ungrounded ends of the rods may be made of larger area.

In general, the effective coupling between the rods, or equivalent structures, varies with frequency, the capacity coupling tending to dominate at the higher frequency and the inductive coupling tending to dominate at the lower frequency. There is, however, always one frequency at which there is zero transmission because of the effect of cancellation of the two types of coupling and this frequency is so chosen with respect to the operating frequencies impressed on the filter that it corresponds with a desired cut-off or rejection frequency. The relative positions of the rejection frequency and the pass-band may be changed by varying the effective taper of the rods, when the construction of Figure 7 is utilized, or by changing the ratio between the areas of different sections of one or more of the rods, as in the case of rod 12 of Figure 1.

As above stated, in the particular construction shown in Figure 1 and for use in the system of Figure 4, the rods 11, 12 and 13 are resonant at the frequency of 1380 megacycles. At a frequency of 1500 megacycles, the inductive and capacitive coupling between the rods buck to zero, so affording very high attenuation at that frequency. The rejection frequency was pre-selected or attained by suitable dimensioning of the large end of the center rod 12 to afford the required capacity coupling between rod 12 and rods 11 and 13, respectively.

To facilitate tuning of the rods to the desired mid-band frequency, provision is made for variation of their effective length within the wave guide 10, or equivalent. Specifically, the outer ends of the rods are threadedly received by the ferrules 20, 21, and 22, fastened to and extending through the side wall 14 of the guide 10. The ferrules or bushings are split to provide spring fingers which firmly hold the rods in any position to which they may be adjusted by a screwdriver or other tool suitable to engage and rotate the external extensions of the rods.

In the particular frequency-modulated radar system shown in Figure 4, part of the energy of the transmitter, a 1500-megacycle oscillator frequency modulated 5 megacycles above and below that frequency by a saw-tooth 120-cycle wave, is introduced into the left-hand end of the wave-guide, Figure 1, as by the coaxial line 23 provided at its input end with coupling loop 24. At the output end of the line 23, its outer conductor is connected to the end wall 19 of the wave guide and the inner conductor 25 is connected to the post or plate 26 extending inwardly from the side wall 14 of the wave-guide. The post 26 and the adjustable plunger 27 or equivalent form a circuit which is broadly resonant at the frequency F1 (1500 megacycles), the mean carrier frequency of the transmitter. There is also introduced into the wave-guide 10 in advance of the first rod 11, a constant frequency, F2 for example, the 120-megacycle output of a local oscillator. This frequency is injected into the cavity in any suitable manner as by a probe or loop or, as indicated in Figure 1, by a connection to the plate 26.

The fitting 28, Figure 2, is for retention of a crystal rectifier or equivalent 29, Figure 4, one of whose terminals is effectively grounded to the guide by the fitting and the other of whose terminals is received by the notch or slit in the upper end of the post 26. This rectifier or mixer derives from the introduced frequencies F1 and F2 a band of high-frequency energy whose mean frequency is equal to the difference between frequencies F1 and F2 and which in width corresponds to the band of frequencies swept by the transmitter; more specifically, in the particular example given, the mid-frequency of the lower side band produced by mixing is 1380 megacycles, the above-mentioned resonant frequency of rods 11, 12 and 13, and the frequency deviation is plus and minus 5 megacycles. The width of band passed by the filter shown in Figure 1 and of dimensions above specified is about 25 megacycles, which is therefore ample to pass all frequencies resulting from the aforesaid mixing even assuming substantial drift of either of the frequencies F1 and F2.

The signal reflected by the distant target, at frequency within the normal range of 1495 megacycles to 1505 megacycles, is introduced into the right-hand end of the cavity 10 as by a concentric line connected to the fitting 31. The external conductor of the line is connected or grounded to the end wall 18 of the cavity and the inner conductor of the line is effectively connected to the post 32 which, in conjunction with the adjustable plunger 33, forms a circuit broadly resonant at the transmitter frequency F1; i. e., about 1500 megacycles. The post or plate 34 and plunger 35 form a second circuit which is broadly resonant at frequency F1 and coupled to the first pre-selector circuit comprising the structure 32 and 33.

It therefore appears there are at opposite ends of the cavity 10, frequency-modulated high-frequency energies having the same mean frequency F1 but with different deviations therefrom at any given instant. The filter provided by the rods 11, 12 and 13 is effective to prevent the frequency-modulated high-frequency energies introduced at either end of the cavity from passing to the other end thereof. Specifically, it prevents the reflected energy introduced by line 31 from passing through the filter to the left end of the cavity and there mixing with the constant frequency F2 to produce, at any given instant, a difference-frequency different from the correct difference-frequency then being produced by action of the rectifier 29 from the oscillator frequency F2 and the transmitter energy being introduced into the right end of the cavity by line 23. It also prevents the instantaneous frequency introduced by line 23 at the left end of the cavity from passing through the filter and acting upon a rectifier 40, Figure 4.

The fitting 39 at the right hand of the cavity 10 is for retention of rectifier 40, of the crystal cartridge type, one terminal of which is connected to the cavity side wall structure through the fitting 39 and whose other terminal is received by the slotted end 41 of the post or plate 34. The rectifier 40 in general corresponds in function with the first detector of a superheterodyne receiver and serves to mix the frequencies passed by the filter formed by rods 11, 12 and 13, and cavity 10 with the frequencies introduced in the right-hand end of the cavity from the receiving antenna by the line 31. There is thus produced by the rectifier-mixer 40 an instantaneous frequency F2 plus or minus a deviation dependent upon the instantaneous frequencies of the energies simultaneously introduced in the opposite ends of cavity 10 by the lines 23 and 31, respectively. Specifically, the output frequency of the mixer 40 may be any frequency in the range of from about 110 to 130 megacycles, depending upon the distance to the target. By means not of interest here and forming no part of the present invention, the output energy of the arrangement shown in Figure 1 is applied, by connection 42 to a broad-band intermediate-frequency amplifier, to additional equipment affording an indication of the distance to the target or object.

The posts 36, 37 and 38 determine the coupling between the circuits to which they are respectively adjacent and are preferably adjustable as shown to provide for adjustment of those couplings. In the particular construction shown, extending the plungers or posts 36, 37, 38 further into the cavity increases the coupling by reversing and increasing the capacity coupling; this because they extend into the cavity from the side wall which is opposite to that from which extend the main sections of the adjacent circuits.

In the system specifically above described and schematically illustrated in Figure 4, the plungers 37 and 38 are adjusted to afford a substantially flat frequency-response through the band of frequencies passed by the filters 11—13, the rectifiers 29 and 40 acting as variable terminal resistors of the filter network. The frequency characteristic of the circuits comprising respectively the elements 26, 27 and 32, 33 are so broadened by the rectifiers that they have but slight effect upon the frequency characteristic of the filter formed by the rods 11—13. The plunger 36 is adjusted for an impedance match for the signal introduced by the line 31.

For greater stability and no rejection point, the rod 12 may be reversed in position to extend inwardly from the side wall 15. In such case, the inductive and capacitive couplings between it and the rods 11—13 are additive instead of bucking, and hence less critical. However, for the system of Figure 4, for which the construction shown in Figure 1 was specially intended, the rejection point was desired to prevent transfer through the filter, in either direction, of frequencies in the neighborhood of 1500 megacycles. Consequently, all three posts 11—13 extend from the same side of the cavity.

Figures 1–3 are drawn to scale and consequently from the dimensions given and proportions shown a filter and mixer arrangement having the frequency characteristics above specified can be duplicated. Furthermore, from these dimensions and from the general rules given above, filters and filter-mixer arrangements for other uses and other frequency ranges may readily be constructed by those skilled in ultra-high frequency techniques.

We claim as our invention:

1. A high-frequency filter comprising an elongated cavity structure suited for propagation of high-frequency electromagnetic energy, means for introducing into said cavity structure high-frequency energy having frequencies lower than the cut-off frequency of said cavity structure for attenuation thereof, and two or more structures within said cavity structure and spaced from one another longitudinally thereof to form a corresponding number of tuned coupled circuits, the dimensions of each of said two or more structures determining the resonant frequency of the corresponding tuned circuit and the spacing between them and between walls of said cavity structure determining the coupling between said tuned circuits and the width of the frequency band passed by said circuits.

2. A high-frequency band-pass filter comprising an elongated cavity structure suited for propagation of high-frequency electromagnetic energy, means for introducing into said cavity structure high-frequency energy having frequencies lower than the cut-off frequency of said cavity structure for attenuation thereof, and two or more rods within said cavity structure spaced longitudinally thereof with their axes substantially parallel to one another, all of said rods extending from one side of said cavity structure and terminating short of the opposite side thereof for cancellation of the inductive and capacitive couplings between said rods at a desired cut-off frequency of the filter, the dimensions of said rods individually providing resonance within the pass band of the filter and the spacing between said rods and between side walls of the cavity structure determining the width of said pass band.

3. A high-frequency filter comprising a rectangular wave-guide suited for propagation of high-frequency electromagnetic energy, means for introducing into said guide high-frequency energy having frequencies lower than the cut-off frequency of said guide for attenuation thereof, and two or more conductive rods spaced longitudinally of said guide, each with its axis substantially normal to a side of said guide and substantially parallel to the axes of the other rods, the length and perimeter of each of said rods providing resonance at a frequency to be passed by the filter and the spacing between the rods and between the walls of said wave-guide determining the width of the frequency band passed by the filter.

4. A high-frequency band-pass filter comprising a wave-guide of oblong cross section suited for propagation of high-frequency electromagnetic energy, means for introducing into said guide high-frequency energy having frequencies below the cut-off frequency of said guide for attenuation thereof, and two or more conductive rods spaced along the guide and extending from one of the more closely-spaced pair of side walls of the guide, the dimensions of each of said rods providing resonance at a frequency to be passed by the filter, the spacing between the rods and between said side walls determining the width of the frequency band passed by the filter, and the extension of said rods from a common side wall effecting cancellation of the inductive and capacitive couplings between the rods at a desired second cut-off frequency of the filter.

5. A high-frequency filter comprising a wave-guide of oblong cross section suited for propagation of high-frequency electromagnetic energy and whose width is at least approximately equal to one half wavelength at a frequency to be rejected by said filter, means for introducing into said guide high-frequency energy having frequencies below the cut-off frequency of said guide for attenuation thereof, and two or more conductive circular rods of uniform cross-sectional area spaced longitudinally of the guide, each connected at its opposite ends to the more widely-spaced side walls of said guide, the spacing between said rods and between the other side walls of the guide determining the width of the frequency band passed by the filter.

6. A high-frequency filter comprising a wave-guide of oblong cross section suited for propagation of high-frequency electromagnetic energy, means for introducing into said guide high-frequency energy having frequencies below the cut-off frequency of said guide for attenuation thereof, and two or more conductive rods spaced longitudinally of and within said guide, each of said rods being approximately one quarter wavelength long at one of said introduced frequencies and connected at one end to one of the pair of more widely-spaced side walls of said guide, the spacing between said rods and between the other pair of side walls determining the width of the frequency band passed by the filter and the connection of said rods to a common wall of the guide providing for cancellation of their inductive and capacitive couplings at a second cut-off frequency of the filter.

7. A high-frequency filter comprising a wave-guide of oblong cross section suited for propagation of high-frequency electromagnetic energy, means for introducing into said guide high-frequency energy having frequencies below the cut-off frequency of said guide for attenuation thereof, and two or more tapered conductive rods spaced longitudinally of and within said guide, each of said rods being approximately one quarter wavelength long at one of said introduced frequencies and connected at its larger end to one of the pair of more widely-spaced side walls of said guide, the spacing between said rods and the other pair of side walls determining the width of the frequency band passed by the filter, the connection of said rods to a common side wall effecting cancellation of the inductive and capacitive couplings between said rods at a second cut-off frequency of the filter, and the aforesaid tapering of the rods enhancing the capacitive coupling between the rods for the lower frequencies.

8. A high-frequency filter as in claim 1 in which said two or more structures extend from one side of said cavity structure and terminate short of the opposite side thereof to effect cancellation of the inductive and capacitive couplings between said structures at a second cut-off frequency of the filter.

9. A high-frequency filter as in claim 3 in which the rods extend from one side wall of the wave-guide and terminate short of the opposite side wall thereof to effect cancellation of the inductive and capacitive couplings between the rods at a second cut-off frequency of the filter.

VERNON D. LANDON.
ROBERT L. HARVEY.
EUGENE O. KEIZER.

REFERENCES CITED

The following references are of record in the file of this patent:

UNITED STATES PATENTS

| Number | Name | Date |
|---|---|---|
| 2,142,159 | Southworth et al. | Jan. 3, 1939 |
| 2,239,905 | Trevor | Apr. 29, 1941 |
| 2,398,096 | Katzin | Apr. 9, 1946 |
| 2,408,420 | Ginzton | Oct. 1, 1946 |
| 2,433,386 | Montgomery | Dec. 30, 1947 |
| 2,433,387 | Mumford | Dec. 30, 1947 |
| 2,436,830 | Sharpless | Mar. 2, 1948 |
| 2,438,119 | Fox | Mar. 23, 1948 |
| 2,469,222 | Atwood et al. | May 3, 1949 |
| 2,516,056 | Deizer | July 18, 1950 |
| 2,527,664 | Wheeler | Oct. 31, 1950 |